(12) United States Patent
Chen

(10) Patent No.: US 7,016,188 B2
(45) Date of Patent: Mar. 21, 2006

(54) COMPUTER CASING

(75) Inventor: Shih-Tsung Chen, Taipei (TW)

(73) Assignee: Shuttle Inc., Taipei (TW)

( * ) Notice: Subject to any disclaimer, the term of this patent is extended or adjusted under 35 U.S.C. 154(b) by 0 days.

(21) Appl. No.: 10/834,939

(22) Filed: Apr. 30, 2004

(65) Prior Publication Data
US 2005/0078442 A1    Apr. 14, 2005

(30) Foreign Application Priority Data
Oct. 14, 2003   (TW) .............................. 92218253 U

(51) Int. Cl.
*G06F 1/16*   (2006.01)
(52) U.S. Cl. ...................... 361/683; 174/50; 174/52.1; 361/801; 361/809
(58) Field of Classification Search ................ 361/679, 361/683, 686, 724–727, 752, 756, 728, 736, 361/796–801, 807–809; 174/50, 59, 52.1
See application file for complete search history.

(56) References Cited

U.S. PATENT DOCUMENTS

| | | | | |
|---|---|---|---|---|
| 4,918,572 A | * | 4/1990 | Tarver et al. ................ 361/736 |
| 5,717,575 A | * | 2/1998 | Copeland et al. ........... 361/756 |
| 5,754,396 A | * | 5/1998 | Felcman et al. ............ 361/683 |
| 6,246,576 B1 | * | 6/2001 | Sands et al. ................ 361/686 |
| 6,496,364 B1 | * | 12/2002 | Medin et al. ............... 361/686 |
| 6,778,409 B1 | * | 8/2004 | Jones ......................... 361/796 |
| 2002/0048150 A1 | * | 4/2002 | Faranda et al. ............. 361/683 |

\* cited by examiner

*Primary Examiner*—Lisa Lea-Edmonds
(74) *Attorney, Agent, or Firm*—Troxell Law Office, PLLC

(57) ABSTRACT

The present invention discloses an improved computer casing that allows a circuit board to be inserted from either the front side or the rear side of the computer casing. The improved computer casing comprises: a main frame, being a frame and comprising a frame hole on its front end, a bottom plate at its bottom, and a bottom groove, a protrusion disposed on the frame hole; a midway board, comprising a snap hole disposed at its upper edge and an extended plate being vertically disposed at a position proximate to each of both ends, a protruded plate disposed thereon, and a rectangular latch plate disposed in the middle section and having a protruded latch; a base plate disposed on both sides of the bottom; a cover frame, having a latch hole at its upper edge and a side hole on its lateral sides, such that the side hole is latched with the protruded plate, the latch hole with the protrusion, and the bottom plate with the bottom groove of the main frame.

3 Claims, 3 Drawing Sheets

COMPUTER CASING

FIELD OF THE INVENTION

The present invention relates to an improved computer casing, more particularly to an improved computer casing that allows a circuit board to be inserted from the front side of the computer casing.

BACKGROUND OF THE INVENTION

As to a computer system, a casing is mainly used for securing components into their positions inside and preventing electromagnetic waves from leaking. In addition, providing a convenient way to assemble computer casings is also one of the main objectives for computer casings.

In general, a printed circuit board such as a motherboard is installed from either side of the operational end of a conventional computer casing. Basically, the front and rear ends of the computer casing are closed ends. Such arrangement has been used for years, and is good for larger computer systems. However, if a motherboard has to be installed from the lateral sides, it will be difficult to reduce the size of a computer casing, and thus is no longer applicable for mini subsystems.

To comply with the requirement of installing a motherboard from the front side towards the rear side of the casing for mini subsystems, the inventor of this invention based on years of experience of developing and selling computers to conduct researches and perform experiments, and finally invented the "improved computer casing" in accordance with this invention.

SUMMARY OF THE INVENTION

The primary objective of the present invention is to provide an improved computer casing that allows a circuit board to be inserted from the front side of the computer casing.

DETAILED DESCRIPTION OF THE PREFERRED EMBODIMENTS

Figure 1:
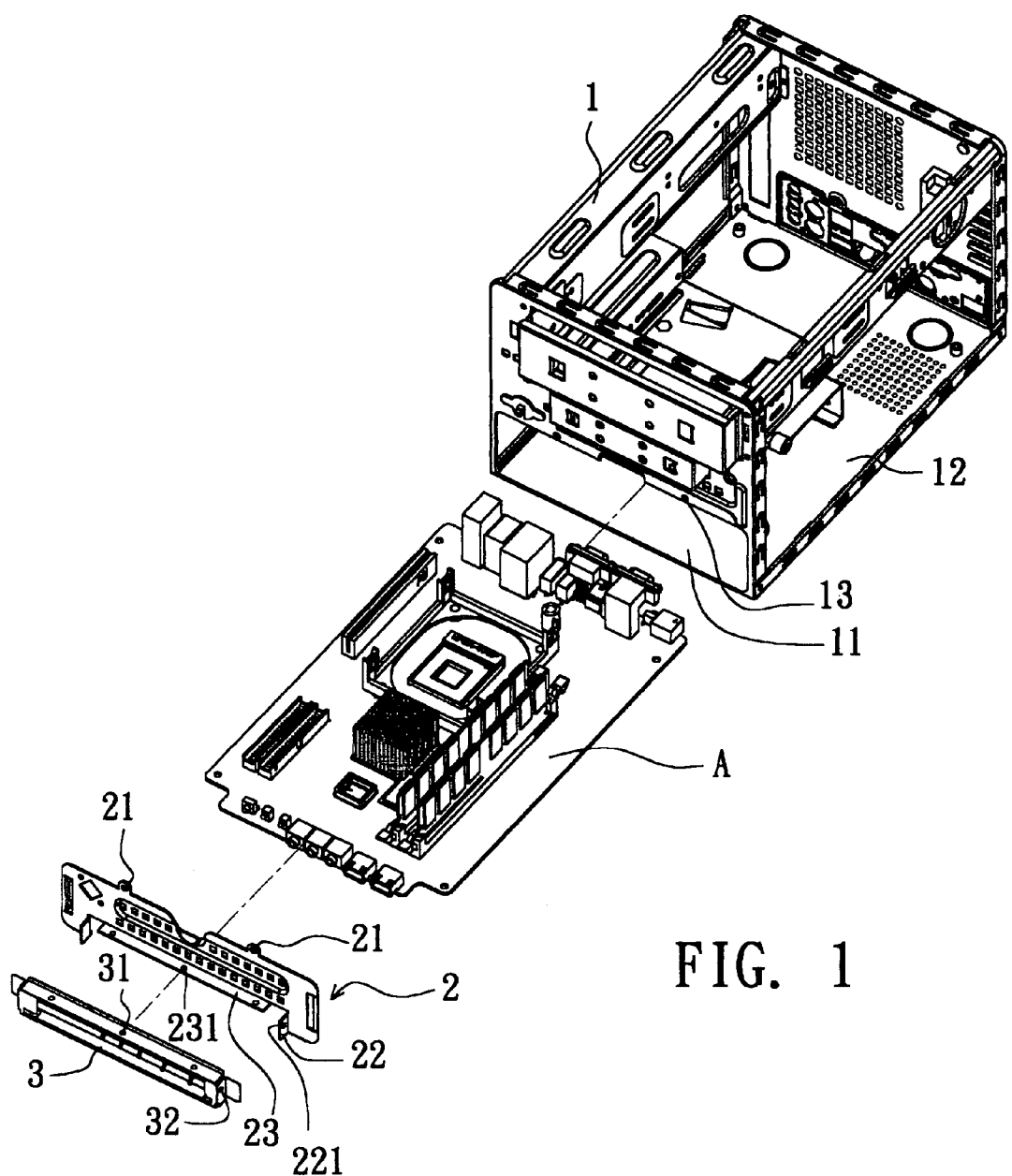
FIG. 1 is a perspective view of the disassembled parts of the computer casing of the present invention.
Figure 2:
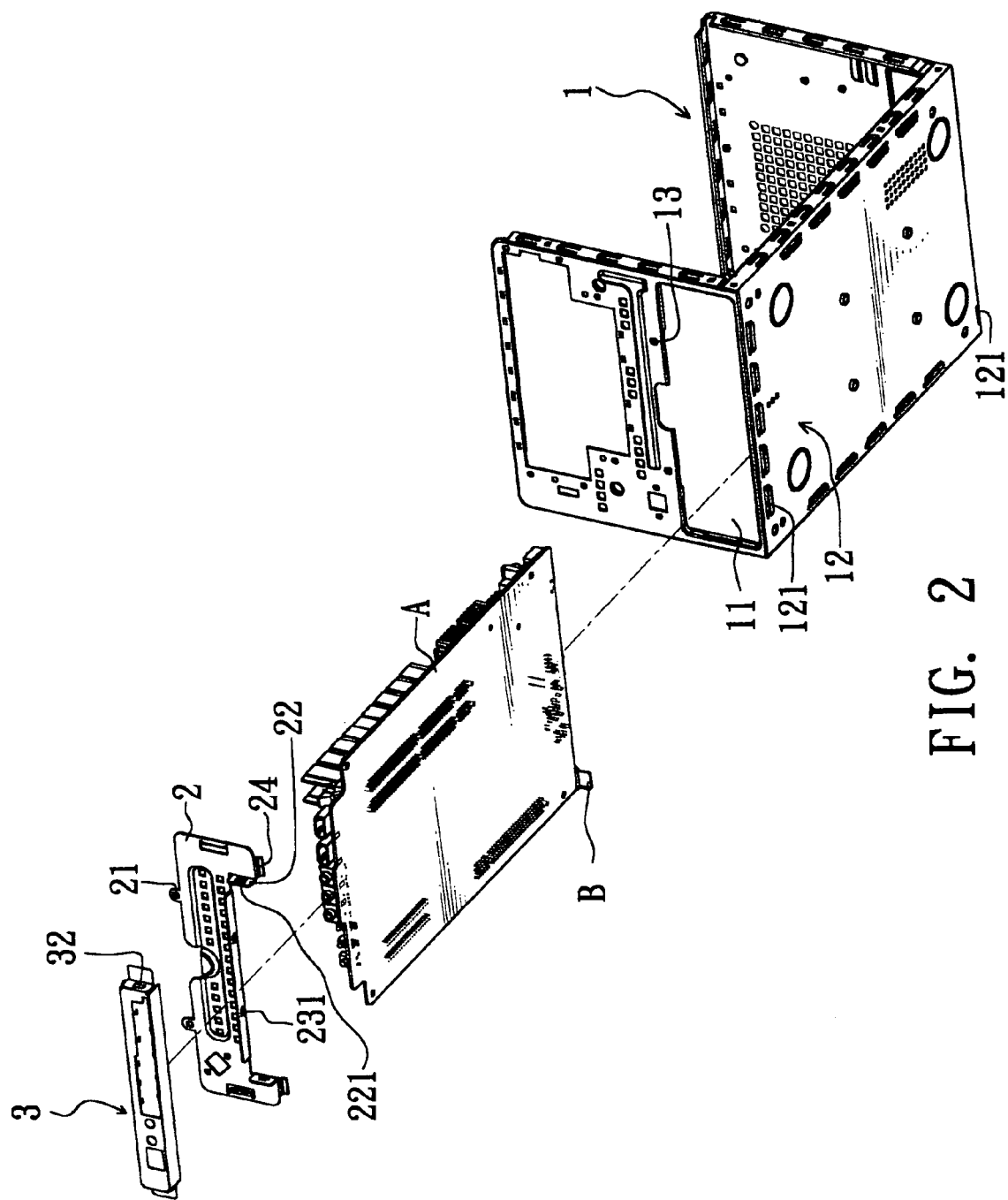
FIG. 2 is a bottom view of the computer casing of the present invention.

To make it easier for our examiner to understand the objective of the invention, its structure, innovative features, and performance, we use a preferred embodiment together with the attached drawings for the detailed description of the invention.

Please refer to the figures. The computer casing of this invention comprises a main frame 1, a midway board 2, and a cover frame 3; wherein the main frame 1 is a frame for accommodating a circuit board A and related components inside, which is a prior art and will not be described here; a horizontal rectangular frame hole 11 is disposed at the lower section of the front side which is also the operating side; a through bottom groove 121 is disposed on a plate at a corner of a bottom plate 12 for receiving and securing a midway board 2 and an extended plate 22 of the circuit board A; and a protrusion 13 is disposed at the top edge.

The midway board 1 is a board, having a lock hole 21 at its top edge for latching the corresponding protrusion 13, and an extended plate 22 being integrally extended from the position proximate both ends and having a protruded plate 221, and a horizontal rectangular latch plate 23 being integrally extended from the middle section of the midway board 2 and having a plurality of protruded latches 231, a base plate 24 being bent and extended backward from both sides of the bottom of the midway board 2 for being passed through an secured to the bottom groove 121.

The cover frame 3 is a frame with a snap hole 31 corresponding to each protruded latch 231 and further having a side hole 32 for the connection of said protruded plate 221.

Figure 3:
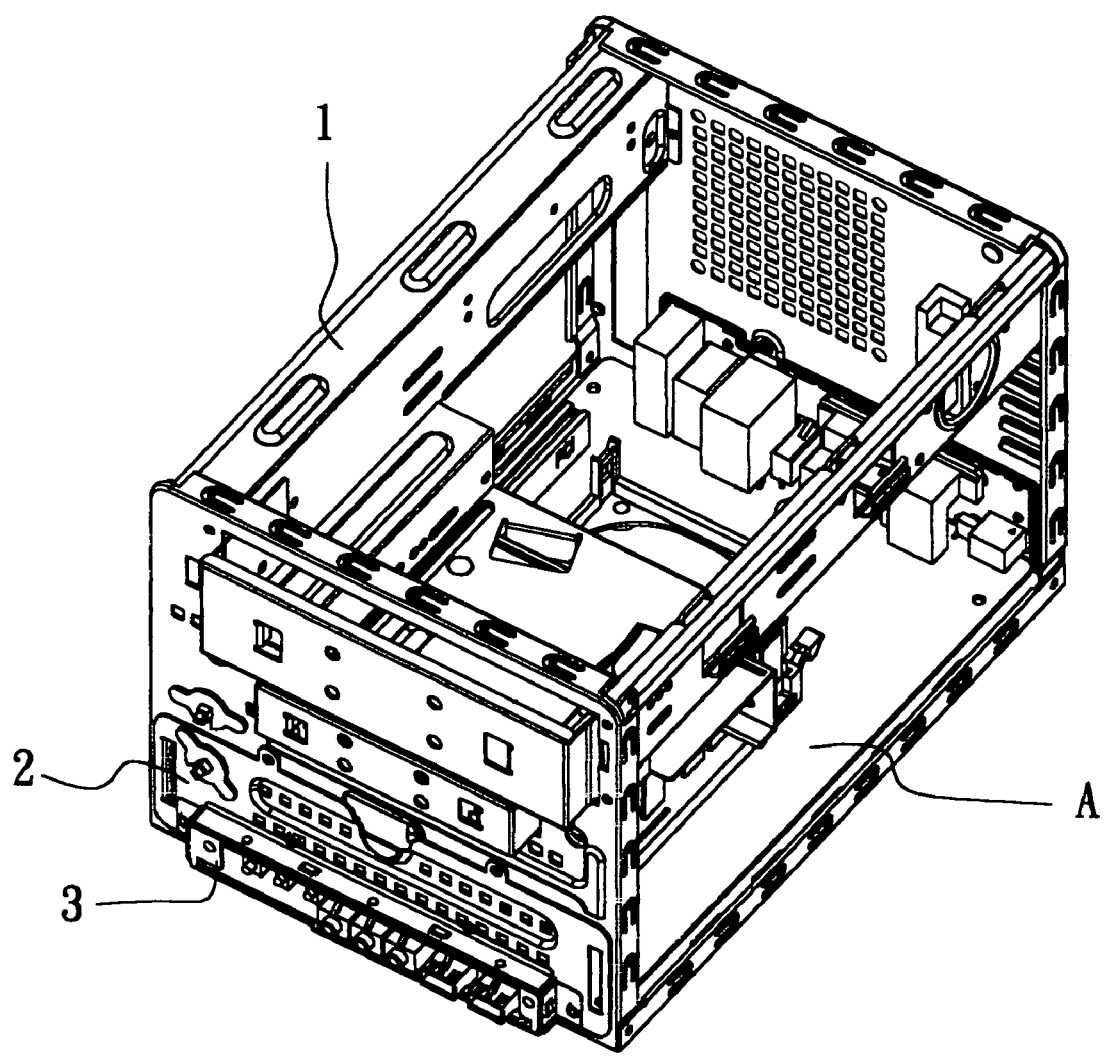
FIG. 3 is a perspective view of the computer casing of the present invention.

Please refer to the figures again. When the computer casing of this invention is assembled, the circuit board A is installed and latched to the bottom groove 121 by the extended plate B; the cover frame 3 is latched with the protruded latch 231 of the midway board 2 by the snap hole 31 and the side hole 32 with the protruded plate 221 to constitute a secure connection. Then, the lock hole 21 of the midway board 2 is latched with the protrusion 13 of the main frame 1 and the base plate 24 with the bottom groove 121 of the bottom plate 12 of the main frame 1 to complete the installation of a circuit board as shown in FIG. 3.

Therefore, the application of this invention allows users to assemble or remove a circuit board without using any tool, which is not provided by the conventional computer casing. The present invention is regarded as a breakthrough of the computer casing.

In summation of the above description, the present invention enhances the performance of the conventional structure, and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An improved computer casing for installing a circuit board from the front-rear direction of the computer casing, comprising:

a main frame, being a frame and having a frame hole at its front end and a bottom plate at its bottom, said bottom plate having a bottom groove, and a protrusion being disposed on said frame hole;

a midway board, having a lock hole disposed at its top edge, an extended plate being vertically extended from a position proximate each of both sides each extendable plate having a protruded plate, a base plate extending from each of two sides of the midway board, and a latch plate being extended from the middle section of said midway board and having a plurality of protruded latches; and a cover frame, having a a plurality of snap holes disposed at it's a top edge and a side hole located on each of two sides thereof;

wherein one side hole being latched with each protruded plate, one of the plurality of protruded latches being latched with each of the plurality of snap holes, said lock hole being latched with said protrusion, and said base plate being latched with the bottom groove of said main frame.

2. The improved computer casing of claim 1, wherein said midway board and cover frame are punched integrally as a whole piece.

3. The improved computer casing of claim 1, wherein said bottom groove is latched by a circuit board extended plate of said circuit board.

* * * * *